United States Patent
Wu et al.

(10) Patent No.: US 11,219,071 B2
(45) Date of Patent: Jan. 4, 2022

(54) SYSTEM INFORMATION TRANSMISSION METHOD AND USER TERMINAL

(71) Applicant: VIVO MOBILE COMMUNICATION CO., LTD., Guangdong (CN)

(72) Inventors: Yumin Wu, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/959,412

(22) PCT Filed: Jan. 8, 2019

(86) PCT No.: PCT/CN2019/070828
§ 371 (c)(1),
(2) Date: Jun. 30, 2020

(87) PCT Pub. No.: WO2019/137368
PCT Pub. Date: Jul. 18, 2019

(65) Prior Publication Data
US 2021/0068159 A1    Mar. 4, 2021

(30) Foreign Application Priority Data
Jan. 11, 2018   (CN) .......................... 201810026262.3

(51) Int. Cl.
*H04W 74/08* (2009.01)
*H04W 48/12* (2009.01)
*H04W 52/02* (2009.01)

(52) U.S. Cl.
CPC ....... *H04W 74/0833* (2013.01); *H04W 48/12* (2013.01); *H04W 52/0209* (2013.01)

(58) Field of Classification Search
CPC .................................................. H04W 74/0833
See application file for complete search history.

(56) References Cited

U.S. PATENT DOCUMENTS

| 2012/0263115 | A1  | 10/2012 | Ohta et al. |
| 2017/0346544 | A1* | 11/2017 | Islam ................. H04W 28/0231 |
| 2018/0262882 | A1* | 9/2018  | You ..................... H04W 72/005 |
| 2019/0215862 | A1* | 7/2019  | Kim ................... H04W 74/0833 |
| 2020/0029180 | A1  | 1/2020  | Lei et al. |

FOREIGN PATENT DOCUMENTS

| CN | 101128031 A | 2/2008 |
| CN | 101909355 A | 12/2010 |
| CN | 106375965 A | 2/2017 |

OTHER PUBLICATIONS

Written Opinion and International Search Report in Application No. PCT/CN2019/070828 dated Jul. 23, 2020.

\* cited by examiner

*Primary Examiner* — Kevin Kim
(74) *Attorney, Agent, or Firm* — Maschoff Brennan

(57) ABSTRACT

The embodiments of the present disclosure provide a system information transmission method and a user terminal. The method includes: sending a system information request to a base station through an uplink message in a random access procedure; not setting a C-RNTI), and receiving system information corresponding to the system information request sent by the base station, if the random access procedure is successful.

13 Claims, 4 Drawing Sheets

SYSTEM INFORMATION TRANSMISSION METHOD AND USER TERMINAL

CROSS-REFERENCE TO RELATED APPLICATION

This application is the U.S. national phase of PCT Application No. PCT/CN2019/070828 filed on Jan. 8, 2019, which claims priority to Chinese Patent Application No. 201810026262.3 filed on Jan. 11, 2018, the disclosures of which are incorporated in their entirety by reference herein.

TECHNICAL FIELD

The present disclosure relates to the field of communication technology, and in particular to a system information transmission method and a user terminal.

BACKGROUND

The system information (SI) of the wireless communication system is mainly divided into a Master Information Block (MIB) and multiple System Information Blocks (SIBs). Among them, the system information block may include system information such as SIB1-SIB20, etc. In practical applications, the system information needs to be broadcast in many scenarios; and currently, all system information including system information such as MIB, SIB1 and SI (where SI may include SIB2~SIB20 or more) is broadcast every time. In this way, the user terminal may receive system information that the user does not need, resulting in a large power consumption of the user terminal and excessive system information overhead in the wireless communication system.

SUMMARY

The embodiments of the present disclosure provide a system information transmission method and a user terminal to solve the problems of large power consumption of the user terminal and excessive system information overhead in the wireless communication system.

To solve the above technical problems, the present disclosure is implemented as: a system information transmission method applied to a user terminal, including:

sending a system information request to a base station through an uplink message in a random access procedure;

not setting a cell-radio network temporary identifier (C-RNTI), and receiving system information corresponding to the system information request sent by the base station, if the random access procedure is successful.

In a first aspect, an embodiment of the present disclosure further provides a system information transmission method applied to a user terminal, including:

sending a system information request to a base station through an uplink message in a random access procedure;

not setting a C-RNTI, and receiving system information corresponding to the system information request sent by the base station, if the random access procedure is successful.

In a second aspect, an embodiment of the present disclosure provides a user terminal including:

a first sending module configured to send a system information request to a base station through an uplink message in a random access procedure;

a first receiving module configured to not set a C-RNTI, and receive system information corresponding to the system information request sent by the base station, if the random access procedure is successful.

In a third aspect, an embodiment of the present disclosure provides a user terminal including a storage, a processor and a computer program stored on the storage and capable of running on the processor, the computer program implementing, when executed by the processor, the steps of the system information transmission method according to the embodiment of the present disclosure.

In a fourth aspect, an embodiment of the present disclosure provides a computer readable storage medium having a computer program stored thereon, the computer program implementing, when executed by a processor, the steps of the system information transmission method according to the embodiment of the present disclosure.

In the embodiments of the present disclosure, a system information request is sent to the base station through an uplink message in a random access procedure; if the random access procedure is successful, the C-RNTI is not set, and system information corresponding to the system information request sent by the base station is received. In this way, it can be achieved that the user terminal receives only the requested system information, and the power consumption of the user terminal and the system information overhead can be saved. In addition, since the C-RNTI is not set, the user terminal will not continuously monitor the control channel, which further saves power consumption of the user terminal.

BRIEF DESCRIPTION OF THE DRAWINGS

In order to explain the technical solutions of the embodiments of the present disclosure more clearly, the following will briefly introduce the drawings required in the description of the embodiments of the present disclosure. Obviously, the drawings in the following description are only some embodiments of the present disclosure. For those of ordinary skill in the art, other drawings can also be obtained based on these drawings without paying any creative effort.

DETAILED DESCRIPTION

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

Figure 1:
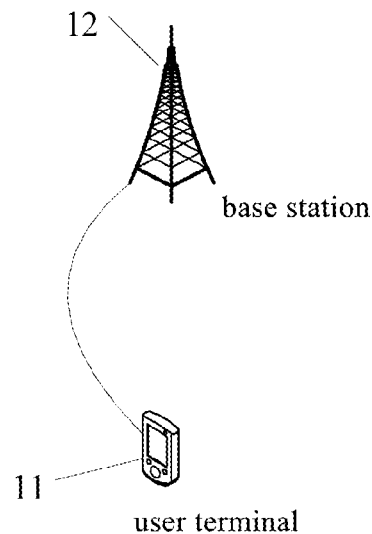
FIG. 1 is a structural diagram of a network system to which the embodiments of the present disclosure can be applied.

Referring to FIG. 1, it is a structural diagram of a network system to which the embodiments of the present disclosure can be applied. As shown in FIG. 1, the network system includes a user terminal 11 and a base station 12. The user terminal 11 may be a user equipment (UE), e.g., a mobile phone, a tablet personal computer, a laptop computer, a personal digital assistant (PDA), a terminal-side devices such as a Mobile Internet Device (MID) or a wearable device. It should be noted that the specific type of the user terminal 11 is not limited in the embodiments of the present disclosure. The user terminal 11 can communicate with the base station 12, e.g., perform SDU transmission between the user terminal 11 and the base station 12. The above base station 12 may be a base station of 5G and later versions (for example: gNB, 5G NR NB), or a base station in other communication systems, or called node B, evolved node B, or other terms in the field; as long as the same technical effect is achieved, the base station is not limited to a specific technical term. It should be noted that, in the embodiments of the present disclosure, only 5G base stations are used as examples, but the specific type of the base station 12 is not limited.

Figure 2:
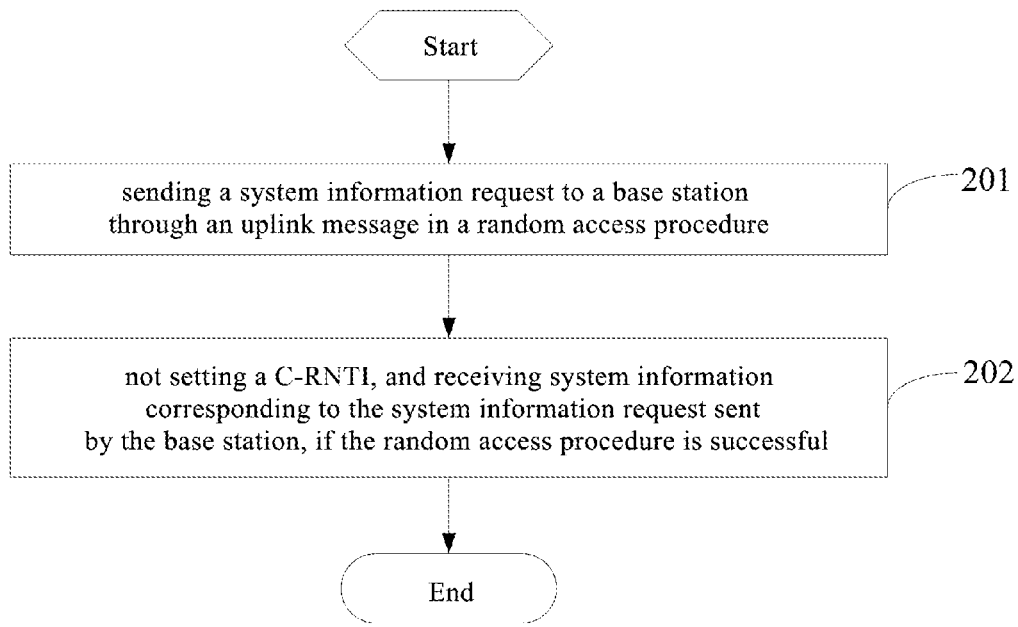
FIG. 2 is a flowchart of a system information transmission method according to an embodiment of the present disclosure.

Referring to FIG. 2, it is a flowchart of a system information transmission method according to an embodiment of the present disclosure which is applied to a user terminal. As shown in FIG. 2, the method includes the following steps:

Step 201, sending a system information request to a base station through an uplink message in a random access procedure.

The above random access procedure may be a non-contention based random access procedure or a contention based random access procedure. The above uplink message may be any uplink message in the random access procedure, for example, Message (Msg) 1 or Msg3 in the random access procedure.

In addition, the above system information request may be a system information request sent on demand by the user terminal, and the system information request may be used to request the base station to send system information required by the user terminal.

It should be noted that, in the embodiment of the present disclosure, the random access procedure may also be referred to as a Random Access Channel (RACH) procedure.

Step 202, not setting a C-RNTI, and receiving system information corresponding to the system information request sent by the base station, if the random access procedure is successful.

The above expression "the random access procedure is successful" may mean "the random access procedure is completed", and "the random access procedure is completed" may also be referred to as "the random access procedure is successfully completed"; or, the above expression "the random access procedure is successful" may mean that the contention resolution corresponding to the random access procedure is successful. For example, the user terminal receives a contention resolution message (such as Msg4) sent by the base station, and determines whether the contention resolution is successful according to the message content of the Msg4; if the message content of the Msg4 matches the message content of the Msg3 sent by the user terminal, it determines that the contention resolution is successful. It should be noted that, in the embodiment of the present disclosure, the success of the random access procedure is not limited.

The system information corresponding to the above system information request may be system information requested by the system information request. For example, in a case that the system information required by the user terminal is system information 13, system information 14 and system information 20, the above system information request is a request for these system information, so that the base station may send the system information 13, the system information 14 and the system information 20 according to the system information request.

In Step 202, the system information corresponding to the system information request sent by the base station may be received directly without setting the C-RNTI after the random access procedure is successful. Since the system information is sent according to the system information sent by the user terminal, the system information may be referred to as on-demand System Information (on-demand SI).

It should be noted that, in the current communication system, the user terminal may receive a temporary C-RNTI sent by the base station in the random access procedure, and set the temporary C-RNTI as a value of the C-RNTI. Further, in the current communication system, after the user terminal obtains an available C-RNTI, the user terminal will continue to monitor a control channel (such as a physical downlink control channel), resulting in increased power consumption of the user terminal. However, in the embodiment of the present disclosure, the C-RNTI will not set in Step 202, and thus the user terminal cannot obtain an available C-RNTI, thereby not monitoring the control channel corresponding to the C-RNTI, which saves the power consumption of the user terminal and allows the user terminal to save more electricity.

It should be noted that the above method may be applied to the 5G system, but this is not limited; as long as the same function can be substantially achieved, it can be applicable for other communication systems, for example, a 4G system, a 6G system, or other communication systems to which the system information is applied, or the like.

In the embodiment of the present disclosure, the system information request is sent to the base station through the uplink message in the random access procedure; if the random access procedure is successful, the C-RNTI is not set, and the system information corresponding to the system information request sent by the base station is received. In this way, it can be achieved that the user terminal receives only the requested system information, and the power consumption of the user terminal and the system information overhead can be saved. In addition, since the C-RNTI is not set, the user terminal will not continuously monitor the control channel, which further saves power consumption of the user terminal.

Figure 3:
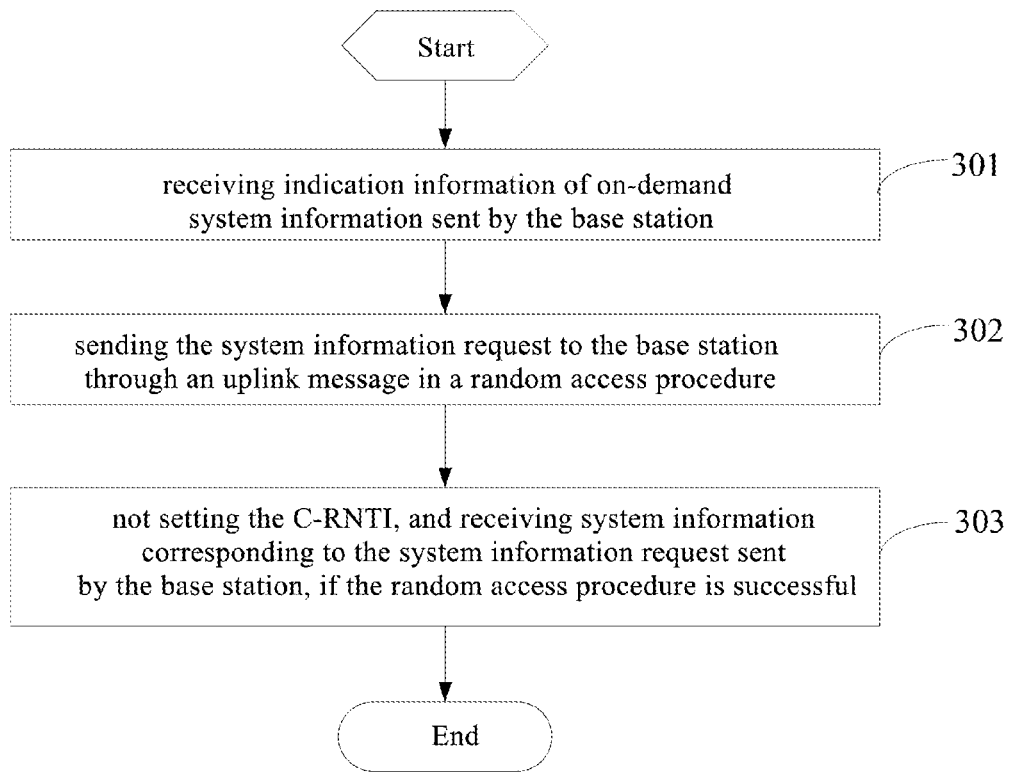
FIG. 3 is a flowchart of another system information transmission method according to an embodiment of the present disclosure.

Referring to FIG. 3, it is a flowchart of another system information transmission method according to an embodiment of the present disclosure. The method is applied to a user terminal, and as shown in FIG. 3, the method includes the following steps:

Step 301, receiving indication information of on-demand SI sent by the base station.

The above indication information of on-demand SI may indicate which system information can be sent only when the user terminal sends a request. With the indication information, the user terminal can prepare to acquire system information it needs.

In the embodiment, obviously, Step 301 is optional. For example, the base station may indicate to the user terminal in advance the system information that requires the user terminal to send a request, or the system information that requires the user terminal to send a request may be defined in the protocol in advance, which is not limited in the embodiment of the present disclosure.

Step 302, sending the system information request to the base station through an uplink message in a random access procedure.

As an optional embodiment, the above step of sending the system information request to the base station through the uplink message in the random access procedure includes:

sending the system information request to the base station through the Msg1 or Msg3 in the random access procedure.

The above Msg1 may be an Msg1 in a non-contention based random access procedure, or an Msg1 in a contention based random access procedure, which is not limited in the embodiment of the present disclosure. The above Msg3 may be an Msg3 in a contention based random access procedure.

By Step 301, the user terminal can send the system information request flexibly and the flexibility of acquisition of the system information is improved. Moreover, since the system information request is sent to the base station by using the Msg1 or Msg3, there is no need to add additional messages, thereby saving transmission resources.

Optionally, before the step of sending the system information request to the base station through the message Msg1 or Msg3 in the random access procedure, the method further includes:

sending a trigger indication for triggering a random access procedure to a Media Access Control (MAC) entity through a Radio Resource Control (RRC) entity, wherein the trigger indication is used to indicate at least one of the system information request and a type of the system information request, the type of the system information request includes a system information request based on the Msg1 or a system information request based on the Msg3.

In this embodiment, the RRC entity of the user terminal can instruct the MAC entity to trigger a random access procedure, and indicate the corresponding system information request and the type of the system information request, so that the random access procedure can be initiated flexibly to adapt to requirements of different services or scenarios, improving the performance of the user terminal to obtain system information. In addition, in this embodiment, the RRC entity may send the RRC message requested by the system information to the MAC entity, so that the MAC entity may send the corresponding uplink message according to the trigger indication.

Optionally, the user terminal sends the system information request to the base station through the Msg3;

after the step of sending the trigger indication for triggering a random access procedure to the MAC entity through the RRC entity, the method further includes:

sending the Msg1 of the random access procedure to the base station according to the trigger indication;

receiving an Msg2 of the random access procedure sent by the base station.

In this embodiment, the Msg3 is sent after the Msg2 sent by the base station has been received, and the Msg2 is a random access response message sent by the base station to the user terminal, thus, receiving the Msg2 indicates that the base station responds to the random access request sent by the user terminal, so that the success rate of sending the system request through the Msg3 is relatively high. In addition, the Msg2 may include uplink authorization information, so that the Msg3 may send the system information request to the base station according to the uplink authorization information.

Step 303, not setting the C-RNTI, and receiving system information corresponding to the system information request sent by the base station, if the random access procedure is successful.

As an optional embodiment, the step of not setting the C-RNTI if the random access procedure is successful includes:

not setting the C-RNTI, if the random access procedure is successful and the random access procedure is triggered by a predetermined trigger event.

In this embodiment, the expression "not setting the C-RNTI if the random access procedure is triggered by a predetermined trigger event" may mean that: if the random access procedure is triggered by the predetermined trigger event, then the C-RNTI will not set; however, if the random access procedure is not triggered by the above predetermined trigger event, then the C-RNTI may be set. In this way, the problem that the user terminal cannot receive the control message sent by the base station because no C-RNTI is set in any random access process can be avoided, and the overall performance of the user terminal is improved.

The above predetermined trigger event may be predetermined by the user terminal, or may be predefined by the protocol, or may be configured by the base station for the user terminal, or may be set by the user, etc.

Preferably, the predetermined trigger event includes a system information request event. In this way, the C-RNTI is not set if the random access procedure is triggered by the system information request event; otherwise, the C-RNTI can be set.

The system information request event may include:

a system information request event based on the Msg1 in the random access procedure or a system information request event based on the Msg3 in the random access procedure.

It should be noted that, in the embodiment, the above predetermined trigger event is not limited. For example, the above predetermined trigger event may be an event of acquiring specific system information, such as an event of acquiring target system information. The target system information may be predetermined, e.g., SI13, SI14, or SI20, etc.

As an optional embodiment, the downlink message in the random access procedure includes a Temporary C-RNTI therein;

the step of not setting the C-RNTI if the random access procedure is successful includes:

not setting the C-RNTI, and discarding the Temporary C-RNTI, if the random access procedure is successful.

The above downlink message may be the Msg2 in the random access procedure, but it is not limited, for example, it may be the Msg4 or other downlink messages.

In this embodiment, it can be achieved that the C-RNTI is not set and the Temporary C-RNTI is discarded, thereby preventing the user terminal from acquiring the C-RNTI, so that the user terminal will not monitor the control channel corresponding to the C-RNTI, which allows the user terminal to save more electricity.

Optionally, the downlink message is the Msg2 in the random access procedure;

the step of not setting the C-RNTI and discarding the Temporary C-RNTI if the random access procedure is successful includes:

not setting the C-RNTI, and discarding the Temporary C-RNTI, if contention resolution is successful.

The above success of contention resolution may be understood as the success of the random access procedure. For example, the user terminal may receive the contention resolution message (Msg4) within the effective time of starting a contention resolution timer (such as a mac-Contention Resolution Timer), and then the user terminal may determine whether the contention resolution is successful. If the contention resolution is successful, the C-RNTI is not set and the Temporary C-RNTI is discarded.

In this embodiment, the Temporary C-RNTI may be sent through the Msg2; the user terminal does not set the C-RNTI and discards the Temporary C-RNTI after the success of the contention resolution, thereby preventing the user terminal from acquiring the C-RNTI, so that the user terminal will not monitor the control channel corresponding to the C-RNTI, which allows the user terminal to save more electricity.

In the present embodiment, multiple optional embodiments are added on the basis of the embodiment shown in FIG. 2. Moreover, compared with the embodiment shown in FIG. 2, the present embodiment can further save power consumption of the user terminal, and can also achieve beneficial effects such as increasing the success rate of the user terminal acquiring system information.

Figure 4:
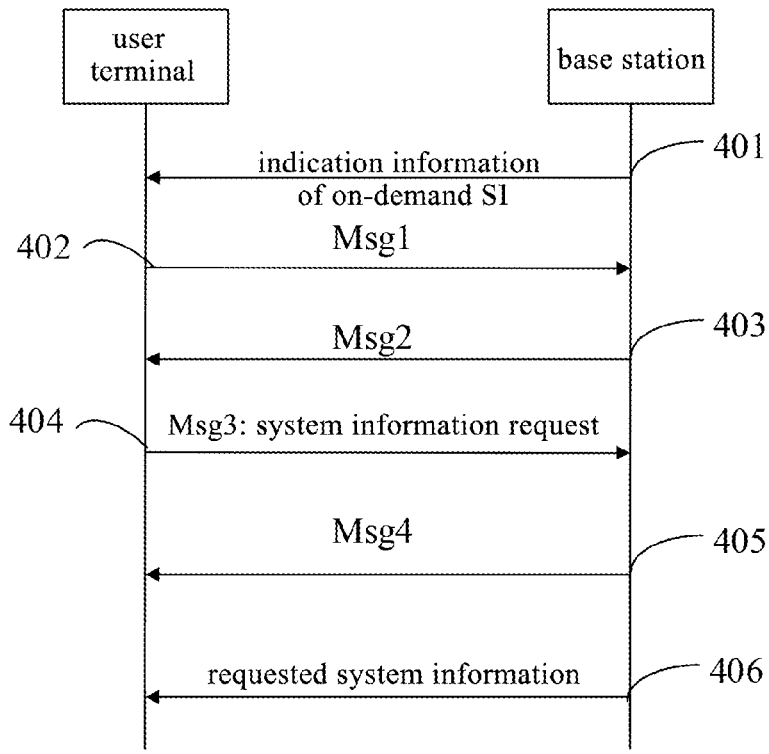
FIG. 4 is a schematic diagram of another system information transmission method according to an embodiment of the present disclosure.

Referring to FIG. 4, it is a schematic diagram of another system information transmission method according to an embodiment of the present disclosure. As shown in FIG. 4, the method includes the following steps:

Step 401, the base station sending indication information of on-demand SI, wherein the indication information may indicate which system information can be sent only when the user terminal sends request information.

Step 402, the RRC entity of the user terminal triggering an SI request based on the Msg3, and generating an RRC message corresponding to the SI request. The RRC entity of the user terminal sends the RRC message of the SI request to the MAC layer.

The RRC entity of the user terminal instructs the MAC entity to trigger a RACH procedure, and indicates that relevant information of triggering the RACH procedure may include any combination of one or more of the following:

a system information request and a type of the system information request;

wherein the type of the system information request may include any combination of one or more of the following:

a system information request based on the Msg1 or a system information request based on the Msg3.

The MAC entity of the user terminal triggers the RACH procedure to send the Msg1 according to the indication information of the RRC entity.

Step 403, the base station sending the Msg2 information to the user terminal.

Step 404, the user terminal sending, through the Msg3, the system information request to the base station according to the uplink authorization information in the Msg2.

Step 405, the base station sending the Msg4 information to the user terminal.

After the user terminal receives the Msg4 information, if the contention resolution is successful, the user terminal does not set the C-RNTI under the following condition (otherwise, the value of the C-RNTI is set):

the user terminal does not set the value of the C-RNTI if the RACH procedure is triggered by a trigger event including at least one of:

a system information request, a system information request based on the Msg1, and a system information request based on the Msg3;

if the user terminal does not set the value of the C-RNTI, the user terminal discards the Temporary C-RNTI.

Step 406, the base station sending to the user terminal the system information requested by the user terminal after receiving the system information request information of the user terminal. The transmission message for transmitting the system information may include at least one of: system information, system information response, and an RRC Connection Reconfiguration.

In the above step, in the system information request procedure of the Msg3, the user terminal can avoid acquiring the C-RNTI, thereby not monitoring the control channel corresponding to the C-RNTI, which allows the user terminal to save more electricity.

Figure 5:
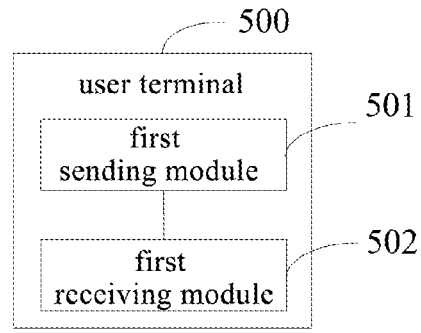
FIG. 5 is a structural diagram of a user terminal according to an embodiment of the present disclosure.

Referring to FIG. 5, it is a structural diagram of a user terminal according to an embodiment of the present disclosure. As shown in FIG. 5, the user terminal includes:

a first sending module 501 configured to send a system information request to a base station through an uplink message in a random access procedure;

a first receiving module 502 configured to not set a C-RNTI, and receive system information corresponding to the system information request sent by the base station, if the random access procedure is successful.

Optionally, the first sending module 501 is configured to send the system information request to the base station through the Msg1 or Msg3 in the random access procedure.

Figure 6:
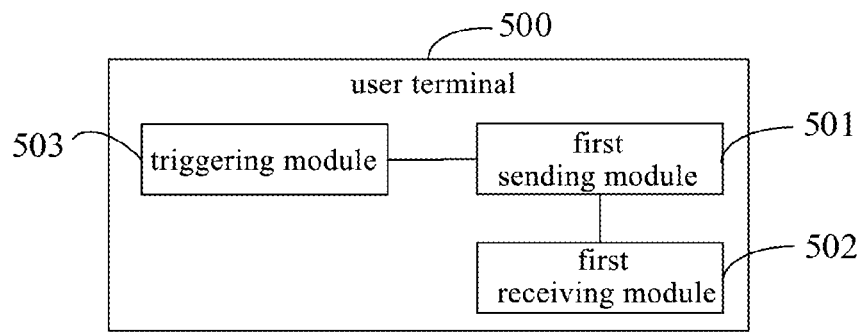
FIG. 6 is a structural diagram of another user terminal according to an embodiment of the present disclosure.

Optionally, as shown in FIG. 6, the user terminal 500 further includes:

a triggering module 503 configured to send a trigger indication for triggering a random access procedure to a media access control (MAC) entity through a radio resource control (RRC) entity, wherein the trigger indication is used to indicate at least one of the system information request and a type of the system information request, the type of the system information request includes a system information request based on the Msg1 or a system information request based on the Msg3.

Optionally, the user terminal sends the system information request to the base station through the Msg3.

Figure 7:
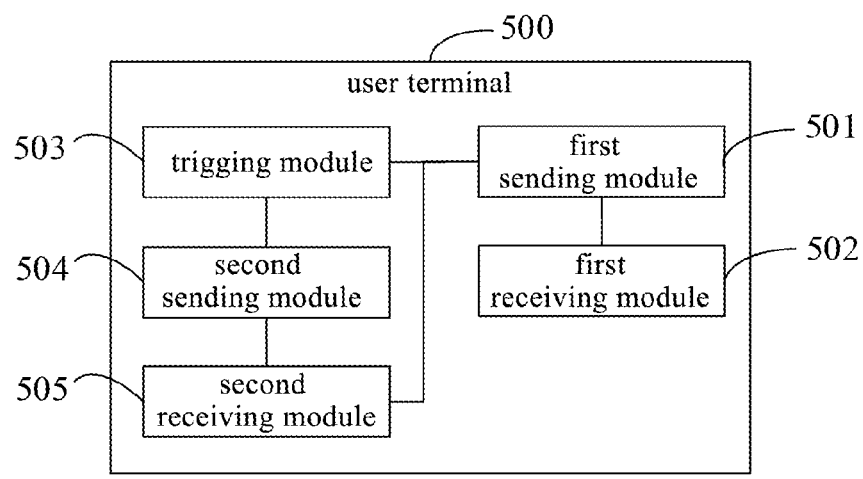
FIG. 7 is a structural diagram of another user terminal according to an embodiment of the present disclosure.

As shown in FIG. 7, the user terminal 500 further includes:

a second sending module 504 configured to send the Msg1 of the random access procedure to the base station;

a second receiving module 505 configured to receive the Msg2 of the random access procedure sent by the base station.

Optionally, the first receiving module 502 is configured to not set the C-RNTI and to receive the system information corresponding to the system information request sent by the base station if the random access procedure is successful and the random access procedure is triggered by a predetermined trigger event.

Optionally, the predetermined trigger event includes a system information request event.

Optionally, the system information request event includes: a system information request event based on the Msg1 in the random access procedure, or a system information request event based on the Msg3 in the random access procedure.

Optionally, the downlink message in the random access procedure includes a Temporary C-RNTI therein;

the first receiving module 502 is configured to not set the C-RNTI and to discard the Temporary C-RNTI, and to receive the system information corresponding to the system information request sent by the base station, if the random access procedure is successful.

Optionally, the downlink message is the Msg2 in the random access procedure;

the step of not setting the C-RNTI and discarding the Temporary C-RNTI if the random access procedure is successful includes:

the first receiving module 502 is configured to not set the C-RNTI and to discard the Temporary C-RNTI, and to receive the system information corresponding to the system information request sent by the base station, if the contention resolution is successful.

The user terminal provided in the embodiment of the present disclosure can achieve the processes achieved by the user terminals in the method embodiments shown in FIGS. 2 to 4, which will not be described again so as to avoid repetition. The user terminal can save the power consumption of the user terminal and the system information overhead.

Figure 8:
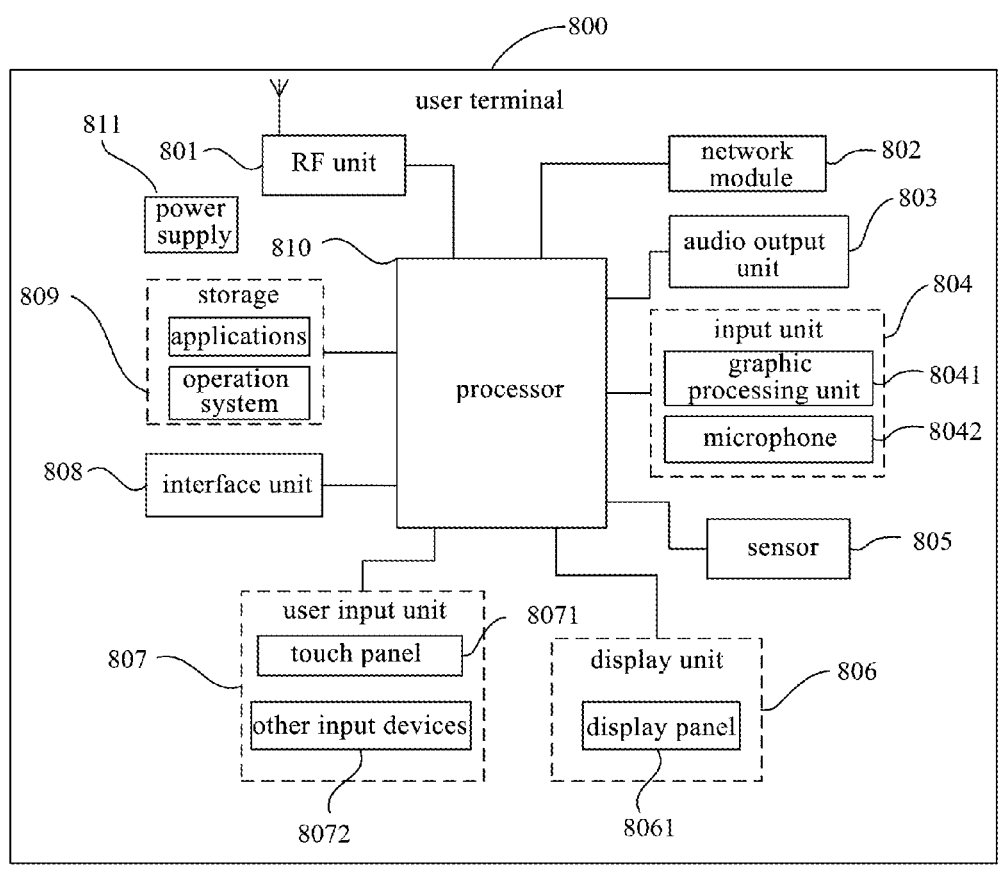
FIG. 8 is a structural diagram of another user terminal according to an embodiment of the present disclosure.

FIG. 8 is a schematic diagram of a hardware structure of a user terminal according to various embodiments of the present disclosure, the user terminal 800 includes, but is not limited to, a RF unit 801, a network module 802, an audio output unit 803, an input unit 804, a sensor 805, a display unit 806, a user input unit 807, an interface unit 808, a storage 809, a processor 810, a power supply 811, and other components. It will be appreciated by those skilled in the art that the structure of the user terminal shown in FIG. 8 does not constitute a limitation on the user terminal, and the user terminal may include more or fewer components than the illustration, or combine certain components, or have different components layout. In the embodiments of the present disclosure, the user terminal include but is not limited to a mobile phone, a tablet computer, a notebook computer, a palmtop computer, an in-vehicle terminal, a wearable device, a pedometer, etc.

Among them, the RF unit 801 is configured to send a system information request to the base station through an uplink message in a random access procedure;

if the random access procedure is successful, not set a cell-radio network temporary identifier (C-RNTI), and receive system information corresponding to the system information request sent by the base station.

Optionally, the operation performed by the RF unit 801 of sending the system information request to the base station through the uplink message in the random access procedure includes:

sending the system information request to the base station through a message Msg1 or Msg3 in the random access procedure.

Optionally, before the step of sending the system information request to the base station through a message Msg1 or Msg3 in the random access procedure, the processor 801 is configured to:

sending a trigger indication for triggering a random access procedure to a media access control (MAC) entity through a radio resource control (RRC) entity, wherein the trigger indication is used to indicate at least one of the system information request and a type of the system information request, the type of the system information request includes a system information request based on the Msg1 or a system information request based on the Msg3.

Optionally, the user terminal sends the system information request to the base station through the Msg3;

after the step of sending the trigger indication for triggering the random access procedure to the MAC entity through the RRC entity, the RF unit 801 is further configured to:

sending the Msg1 of the random access procedure to the base station according to the trigger indication;

receiving an Msg2 of the random access procedure sent by the base station.

Optionally, the step of not setting the C-RNTI if the random access procedure is successful includes:

not setting the C-RNTI, if the random access procedure is successful and the random access procedure is triggered by a predetermined trigger event.

Optionally, the predetermined trigger event includes: a system information request event.

Optionally, the system information request event includes:

a system information request event based on the Msg1 in the random access procedure or a system information request event based on the Msg3 in the random access procedure.

Optionally, a downlink message in the random access procedure includes a Temporary C-RNTI;

the step of not setting the C-RNTI if the random access procedure is successful includes:

not setting the C-RNTI, and discarding the Temporary C-RNTI, if the random access procedure is successful.

Optionally, the downlink message is an Msg2 in the random access procedure;

the step of not setting the C-RNTI and discarding the Temporary C-RNTI if the random access procedure is successful includes:

not setting the C-RNTI, and discarding the Temporary C-RNTI, if contention resolution is successful.

The user terminal can save the power consumption of the user terminal and the system information overhead.

It will be appreciated that, in the embodiment of the present disclosure, the RF unit 801 may be used for signal receiving and sending during sending and receiving information or during a call, specifically, after receiving the downlink data from the base station, it transmits the same to the processor 810 for processing; furthermore, it sends the uplink data to the base station. Generally, the RF unit 801 includes but is not limited to an antenna, at least one amplifier, a transceiver, a coupler, a low noise amplifier, a duplexer, and the like. In addition, the RF unit 801 can also communicate with the network and other devices through a wireless communication system.

The user terminal provides users with wireless access to the broadband Internet through the network module 802, such as helping users to send and receive e-mail, browse web pages, access streaming media, and the like.

The audio output unit 803 may convert the audio data received by the RF unit 801 or the network module 802 or stored in the storage 809 into an audio signal and output as sound. Moreover, the audio output unit 803 may also provide audio output related to specific functions performed by the user terminal 800 (e.g., call signal reception sound, message reception sound, etc.). The audio output unit 803 includes a speaker, a buzzer, a receiver, and the like.

The input unit 804 is used to receive audio or video signals. The input unit 804 may include a Graphics processing Unit (GPU) 8041 and a microphone 8042. The graphics processing unit 8041 processes image data of still pictures or video obtained by an image capturing device (such as a camera) in the video capturing mode or the image capturing mode. The processed image frame may be displayed on the display unit 806. The image frame processed by the graphics processing unit 8041 may be stored in the storage 809 (or other storage medium) or sent via the RF unit 801 or the network module 802. The microphone 8042 can receive sound, and can process such sound into audio data. The processed audio data can be converted into a format that can be sent to the mobile communication base station via the RF unit 801 in the telephone call mode, and can be output.

The user terminal 800 also includes at least one sensor 805, such as a light sensor, a motion sensor, and other sensors. Specifically, the light sensor includes an ambient light sensor and a proximity sensor, wherein the ambient light sensor can adjust the brightness of the display panel 8061 according to the brightness of the ambient light, and the proximity sensor can close the display panel 8061 and/or the backlight when the user terminal 800 moves to the ear. As a type of motion sensor, the accelerometer sensor can detect the magnitudes of accelerations in various directions (generally three axes), and can detect the magnitude and direction of gravity when not moving, and can be used to recognize the posture of the terminal (such as horizontal and vertical screen switching, related games, magnetometer attitude calibration), to perform vibration recognition related functions (such as pedometer, tapping), etc.; the sensor 805 may also include a fingerprint sensor, a pressure sensor, an iris sensor, a molecular sensor, a gyroscope, a barometer, a hygrometer, a thermometer, an infrared sensor, etc., which will not be repeated here.

The display unit 806 is used to display information input by the user or information provided to the user. The display unit 806 may include a display panel 8061, and the display panel 8061 may be configured in the form of a Liquid Crystal Display (LCD), an Organic Light-Emitting Diode (OLED), or the like.

The user input unit 807 may be used to receive input numeric or character information, and generate key signal input related to user settings and function control of the user terminal. Specifically, the user input unit 807 includes a touch panel 8071 and other input devices 8072. The touch panel 8071, also known as a touch screen, can collect user's touch operation on or near it (for example, the user's operation on or near the touch panel 8071 using any suitable object or accessory, such as a finger or a stylus). The touch panel 8071 may include a touch detection device and a touch controller. Among them, the touch detection device detects the user's touch orientation, and detects the signal generated by the touch operation, and transmits the signal to the touch controller; the touch controller receives touch information from the touch detection device and converts it into contact coordinates, then sends the same to the processor 810, and receives and executes the command sent by the processor 810. In addition, the touch panel 8071 can be implemented in various types such as resistive, capacitive, infrared, and surface acoustic wave types. In addition to the touch panel 8071, the user input unit 807 may also include other input devices 8072. Specifically, other input devices 8072 may include, but are not limited to, a physical keyboard, function keys (such as volume control buttons, switch buttons, etc.), a trackball, a mouse, and a joystick, which will not be repeated here.

Further, the touch panel 8071 may be overlaid on the display panel 8061. When the touch panel 8071 detects a touch operation on or near it, it transmits the touch operation to the processor 810 to determine the type of touch event, and then the processor 810 provides a corresponding visual output on the display panel 8061 according to the type of touch event. Although in FIG. 8, the touch panel 8071 and the display panel 8061 are implemented as two independent components to realize the input and output functions of the terminal, in some embodiments, the touch panel 8071 and the display panel 8061 may be integrated to implement the input and output functions of the terminal, which is not limited here.

The interface unit 808 is an interface for connecting an external device to the user terminal 800. For example, the external device may include a wired or wireless headset port, an external power (or battery charger) port, a wired or wireless data port, a memory card port, a port for connecting a device having an identification module, an audio input/output (I/O) port, a video I/O port, a headphone port, etc. The interface unit 808 may be used to receive input from external devices (e.g., data information, power, etc.) and transmit the received input to one or more elements within the user terminal 800 or may be used to transfer data between the user terminal 800 and the external devices.

The storage 809 may be used to store software programs and various data. The storage 809 may mainly include a program storage area and a data storage area, wherein the program storage area may store an operating system, applications required by at least one function (such as a sound playback function, an image playback function, etc.); the data storage area may store data created according to the use of a mobile phone (such as audio data, phone books, etc.), etc. In addition, the storage 809 may include a high-speed random access memory, and may also include a non-volatile storage, such as at least one magnetic disk storage device, a flash memory device, or other volatile solid-state storage devices.

The processor 810 is the control center of the user terminal, connects various parts of the entire terminal by using various interfaces and lines, performs various functions of the user terminal and processes data by running or executing software programs and/or modules stored in the storage 809 and calling data stored in the storage 809, so as to monitor the user terminal as a whole. The processor 810 may include one or more processing units; optionally, the processor 810 may integrate an application processor and a modem processor, where the application processor mainly processes an operating system, a user interface, and applications, etc. The modem processor mainly processes wireless communication. It can be understood that the foregoing modem processor may not be integrated into the processor 810.

The user terminal 800 may further include a power supply 811 (such as a battery) that supplies power to various components. Optionally, the power supply 811 may be logically connected to the processor 810 through a power management system, so as to implement charging, discharging, and power consumption management through the power management system.

In addition, the user terminal 800 includes some unillustrated functional modules, which will not be repeated here.

Optionally, an embodiment of the present disclosure further provides a user terminal including a processor 810, a storage 809, a computer program stored on the storage 809 and capable of running on the processor 810. When executed by the processor 810, the computer program implements various processes of the above embodiments of the system information transmission method, and can achieve the same technical effects, which will not be described here to avoid repetition.

An embodiment of the present disclosure further provides a computer readable storage medium having a computer program stored thereon. When executed by a processor, the computer program implements various processes of the above embodiments of the system information transmission method, and can achieve the same technical effects, which will not be described here to avoid repetition. The computer readable storage medium may be a Read Only Memory (ROM), a Random Access Memory (RAM), a magnetic disk, an optical disk, etc.

It should be noted that, herein the terms "comprising", "including" or any other variant thereof are intended to cover non-exclusive inclusion, so that a process, method, article or device that includes a series of elements includes not only those elements, but also other elements that are not explicitly listed, or further includes elements inherent to such process, method, article, or device. Without more restrictions, the element defined by the sentence "comprising a . . . " does not exclude that there are other identical elements in the process, method, article or device that includes the element.

With the description of the above embodiments, those skilled in the art can clearly understand that the methods in the above embodiments can be implemented by means of software plus a necessary general hardware platform, and of course, can also be implemented by hardware, but in many cases the former is a optional embodiment. Based on such an understanding, the essential technical solutions of the present disclosure, or part of the technical solutions that contributes to the related art, can be embodied in the form of a software product; the computer software product is stored in a storage medium (such as a ROM/RAM, a magnetic disk, or an optical disk), including several instructions used to cause a terminal (which may be a mobile phone, a computer, a server, an air conditioner, or a network device, etc.) to perform the methods described in various embodiments of the present disclosure.

The embodiments of the present disclosure have been described above with reference to the drawings, but the present disclosure is not limited to the above specific embodiments. The above specific embodiments are merely schematic, not restrictive. Under the inspiration of the present disclosure, many forms can be made by those skilled in the art without departing from the purpose of the present disclosure and the scope protected by the claims, all of which fall within the protective scope of the present disclosure.

What is claimed is:

1. A system information transmission method applied to a user terminal, comprising:
    sending a system information request to a base station through an uplink message in a random access procedure;
    not setting a cell-radio network temporary identifier (C-RNTI), and receiving system information corresponding to the system information request sent by the base station, if the random access procedure is successful
    wherein the step of sending the system information request to the base station through the uplink message in the random access procedure comprises:
    sending the system information request to the base station through a message Msg1 or Msg3 in the random access procedure; and
    wherein, before the step of sending the system information request to the base station through the message Msg1 or Msg3 in the random access procedure, the method further comprises:
    sending a trigger indication for triggering a random access procedure to a media access control (MAC) entity through a radio resource control (RRC) entity, wherein the trigger indication is used to indicate at least one of the system information request and a type of the system information request, the type of the system information request comprises a system information request based on the Msg1 or a system information request based on the Msg3.

2. The method according to claim 1, wherein the step of not setting the C-RNTI if the random access procedure is successful comprises:
    not setting the C-RNTI, if the random access procedure is successful and the random access procedure is triggered by a predetermined trigger event.

3. The method according to claim 2, wherein the predetermined trigger event comprises: a system information request event.

4. The method according to claim 3, wherein the system information request event comprises:
    a system information request event based on an Msg1 in the random access procedure or a system information request event based on an Msg3 in the random access procedure.

5. The method according to claim 1, wherein a downlink message in the random access procedure comprises a Temporary C-RNTI;
    the step of not setting the C-RNTI if the random access procedure is successful comprises:
    not setting the C-RNTI, and discarding the Temporary C-RNTI, if the random access procedure is successful.

6. The method according to claim 5, wherein the downlink message is an Msg2 in the random access procedure;
    the step of not setting the C-RNTI and discarding the Temporary C-RNTI if the random access procedure is successful comprises:
    not setting the C-RNTI, and discarding the Temporary C-RNTI, if the contention resolution is successful.

7. A user terminal comprising a storage, a processor and a computer program stored on the storage and capable of running on the processor, the computer program implementing, when executed by the processor, the steps of a system information transmission method, the method comprising:
    sending a system information request to a base station through an uplink message in a random access procedure;
    not setting a cell-radio network temporary identifier (C-RNTI), and receiving system information corresponding to the system information request sent by the base station, if the random access procedure is successful
    wherein the step of sending the system information request to the base station through the uplink message in the random access procedure comprises:
    sending the system information request to the base station through a message Msg1 or Msg3 in the random access procedure; and
    before the step of sending the system information request to the base station through the message Msg1 or Msg3 in the random access procedure, the method further comprises:
    sending a trigger indication for triggering a random access procedure to a media access control (MAC) entity through a radio resource control (RRC) entity, wherein the trigger indication is used to indicate at least one of the system information request and a type of the system information request, the type of the system information request comprises a system information request based on the Msg1 or a system information request based on the Msg3.

8. A non-transitory computer readable storage medium having a computer program stored thereon, the computer program implementing, when executed by a processor, the steps of a system information transmission method, the method comprising:
  sending a system information request to a base station through an uplink message in a random access procedure;
  not setting a cell-radio network temporary identifier (C-RNTI), and receiving system information corresponding to the system information request sent by the base station, if the random access procedure is successful;
  wherein the step of sending the system information request to the base station through the uplink message in the random access procedure comprises:
  sending the system information request to the base station through a message Msg1 or Msg3 in the random access procedure; and
  before the step of sending the system information request to the base station through the message Msg1 or Msg3 in the random access procedure, the method further comprises:
  sending a trigger indication for triggering a random access procedure to a media access control (MAC) entity through a radio resource control (RRC) entity, wherein the trigger indication is used to indicate at least one of the system information request and a type of the system information request, the type of the system information request comprises a system information request based on the Msg1 or a system information request based on the Msg3.

9. The user terminal according to claim 7, wherein in the system information transmission method implemented by the computer program when executed by the processor, the step of not setting the C-RNTI if the random access procedure is successful comprises:
  not setting the C-RNTI, if the random access procedure is successful and the random access procedure is triggered by a predetermined trigger event.

10. The user terminal according to claim 9, wherein in the system information transmission method implemented by the computer program when executed by the processor, the predetermined trigger event comprises: a system information request event.

11. The user terminal according to claim 10, wherein in the system information transmission method implemented by the computer program when executed by the processor, the system information request event comprises:
  a system information request event based on an Msg1 in the random access procedure or a system information request event based on an Msg3 in the random access procedure.

12. The user terminal according to claim 7, wherein in the system information transmission method implemented by the computer program when executed by the processor, a downlink message in the random access procedure comprises a Temporary C-RNTI; the step of not setting the C-RNTI if the random access procedure is successful comprises:
  not setting the C-RNTI, and discarding the Temporary C-RNTI, if the random access procedure is successful.

13. The user terminal according to claim 12, wherein in the system information transmission method implemented by the computer program when executed by the processor, the downlink message is an Msg2 in the random access procedure;
  the step of not setting the C-RNTI and discarding the Temporary C-RNTI if the random access procedure is successful comprises:
  not setting the C-RNTI, and discarding the Temporary C-RNTI, if the contention resolution is successful.

* * * * *